(12) United States Patent
Sutton, II et al.

(10) Patent No.: US 8,660,266 B2
(45) Date of Patent: *Feb. 25, 2014

(54) METHOD OF DELIVERING DIRECT PROOF PRIVATE KEYS TO DEVICES USING AN ON-LINE SERVICE

(75) Inventors: James A. Sutton, II, Portland, OR (US); Ernie F. Brickell, Portland, OR (US); Clifford D. Hall, Orangevale, CA (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/710,439

(22) Filed: Feb. 23, 2010

(65) Prior Publication Data

US 2010/0150351 A1 Jun. 17, 2010

Related U.S. Application Data

(63) Continuation of application No. 10/892,256, filed on Jul. 14, 2004, now Pat. No. 7,697,691.

(51) Int. Cl.
*G06F 21/00* (2013.01)

(52) U.S. Cl.
USPC ............. 380/44; 380/277; 380/279; 380/282; 713/193; 726/34

(58) Field of Classification Search
USPC .................................................. 380/277, 44
See application file for complete search history.

(56) References Cited

U.S. PATENT DOCUMENTS

| | | | |
|---|---|---|---|
| 5,430,802 | A | 7/1995 | Page |
| 5,581,621 | A | 12/1996 | Koyama et al. |
| 5,771,291 | A | 6/1998 | Newton et al. |
| 5,857,021 | A | 1/1999 | Kataoka et al. |

(Continued)

FOREIGN PATENT DOCUMENTS

| | | |
|---|---|---|
| CN | 1985466 | 6/2007 |
| CN | 101019368 | 8/2007 |

(Continued)

OTHER PUBLICATIONS

Baldwin, Adrian. Shiu, Simon. "Encryption and Key Management in a SAN". First International IEEE Security in Storage Workshop. Pub. Date: Dec. 2002. Relevant pp. 35-44. Found on the World Wide Web at: http://ieeexplore.ieee.org/stamp/stamp.jsp?tp=&arnumber=1183508.*

(Continued)

*Primary Examiner* — Cordelia Zecher
*Assistant Examiner* — Jeremiah Avery
(74) *Attorney, Agent, or Firm* — Trop, Pruner & Hu, P.C.

(57) ABSTRACT

Delivering a Direct Proof private key to a device installed in a client computer system in the field may be accomplished in a secure manner without requiring significant non-volatile storage in the device. A unique pseudo-random value is generated and stored in the device at manufacturing time. The pseudo-random value is used to generate a symmetric key for encrypting a data structure holding a Direct Proof private key and a private key digest associated with the device. The resulting encrypted data structure is stored on a protected on-line server accessible by the client computer system.

18 Claims, 13 Drawing Sheets

(56) References Cited

U.S. PATENT DOCUMENTS

| | | | |
|---|---|---|---|
| 5,924,094 A * | 7/1999 | Sutter | 707/10 |
| 6,032,260 A | 2/2000 | Sasmazel et al. | |
| 6,032,261 A | 2/2000 | Hulyalkar | |
| 6,036,061 A | 3/2000 | O'Donnell | |
| 6,038,322 A * | 3/2000 | Harkins | 380/279 |
| 6,151,676 A | 11/2000 | Cuccia et al. | |
| 6,185,316 B1 | 2/2001 | Buffam | |
| 6,389,403 B1 | 5/2002 | Dorak | |
| 6,411,715 B1 * | 6/2002 | Liskov et al. | 380/277 |
| 6,424,717 B1 * | 7/2002 | Pinder et al. | 380/239 |
| 6,438,666 B2 | 8/2002 | Cassagnol et al. | |
| 6,611,812 B2 | 8/2003 | Hurtado et al. | |
| 6,711,263 B1 * | 3/2004 | Nordenstam et al. | 380/282 |
| 6,738,904 B2 * | 5/2004 | Linnartz et al. | 713/189 |
| 6,749,511 B2 | 6/2004 | Day | |
| 6,792,113 B1 * | 9/2004 | Ansell et al. | 380/284 |
| 6,826,616 B2 * | 11/2004 | Larson et al. | 709/228 |
| 6,829,250 B2 | 12/2004 | Voit et al. | |
| 6,898,706 B1 * | 5/2005 | Venkatesan et al. | 713/167 |
| 6,941,456 B2 | 9/2005 | Wilson | |
| 6,983,368 B2 * | 1/2006 | Wheeler et al. | 713/170 |
| 6,983,511 B2 | 1/2006 | Massaro | |
| 6,987,853 B2 * | 1/2006 | Uner | 380/44 |
| 7,093,139 B2 * | 8/2006 | Silverbrook et al. | 713/194 |
| 7,178,030 B2 | 2/2007 | Scheidt et al. | |
| 7,216,100 B2 | 5/2007 | Elliott | |
| 7,216,110 B1 * | 5/2007 | Ogg et al. | 705/80 |
| 7,297,188 B2 | 11/2007 | Nielsen | |
| 7,392,377 B2 | 6/2008 | Ogg et al. | |
| 7,526,651 B2 | 4/2009 | Modiano et al. | |
| 7,693,286 B2 | 4/2010 | Sutton et al. | |
| 7,792,303 B2 | 9/2010 | Brickell | |
| 7,844,819 B2 | 11/2010 | Minemura | |
| 2002/0080190 A1 | 6/2002 | Hamann et al. | |
| 2002/0178354 A1 * | 11/2002 | Ogg et al. | 713/155 |
| 2003/0037237 A1 * | 2/2003 | Abgrall et al. | 713/166 |
| 2003/0182584 A1 | 9/2003 | Banes et al. | |
| 2004/0039924 A1 * | 2/2004 | Baldwin et al. | 713/189 |
| 2004/0103281 A1 | 5/2004 | Brickell | |
| 2006/0117181 A1 | 6/2006 | Brickell | |

FOREIGN PATENT DOCUMENTS

| | | |
|---|---|---|
| CN | 101019369 | 8/2007 |
| DE | 195 39 538 A1 | 5/1996 |
| DE | 102 18 835 A1 | 4/2002 |
| DE | 112005001666 T5 | 5/2007 |
| DE | 112005001672 T | 5/2007 |
| DE | 112005001654 T5 | 11/2007 |
| EP | 0 784 386 A2 | 7/1997 |
| EP | 0877314 A1 | 11/1998 |
| EP | 1067470 A2 | 1/2001 |
| EP | 1 617 587 A1 | 1/2006 |
| GB | 2439150 A | 12/2007 |
| JP | 1200735 | 8/1989 |
| JP | 11-143781 | 5/1999 |
| JP | 2002-016592 | 1/2002 |
| JP | 2002-314522 | 10/2002 |
| WO | 99/31842 A1 | 6/1999 |
| WO | 00/49764 | 8/2000 |
| WO | 00/69206 | 11/2000 |
| WO | 01/43476 | 6/2001 |
| WO | 01/63954 | 8/2001 |
| WO | 01/82650 | 11/2001 |
| WO | 02/45453 | 6/2002 |
| WO | 02/73928 | 9/2002 |
| WO | 2006/019614 A2 | 2/2006 |
| WO | 2006/023151 A3 | 3/2006 |
| WO | 2006/025952 A2 | 3/2006 |

OTHER PUBLICATIONS

Feige, Uriel; Lapidot, Dror; Shamir, Adi. Multiple Non-Interactive Zero Knowledge Proofs Based on a Single Random String. 31st Annual Symposium on Foundations of Computer Science. vol. 1 Pub. Date: 1990. Relevant pp. 308-317. Found on the World Wide Web at: http://ieeexplore.ieee.org/stamp/stamp.jsp?tp=&arnumber=89549.*

Japanese Patent Office, Office Action for corresponding JP Application No. 2007-521519, dated May 25, 2010, 4 pgs.

Hawthorne, W.M., "An Alternative to Public Key Encryption." European Convention on Security and Detection, Published May 1995, Relevant pp. 142-145 (4 pgs).

Menezes, et al., "Handbook of Applied Cryptography," CRC Press, Inc. 1997 pp. 330-331, 388-390, 394-395, 397-398, 472, 515-516, 548-551, 1997 (15 pages).

Menezes et al., "Handbook of Applied Cryptography," Chapter 9 "Hash Functions and Date Integrity," CRC Press, Inc. 1997, pp. 321-332 (13 pages).

Schroeder, "Integrated-impulse method measuring sound decay without impulses." Journal of the Acoustical Society of America, vol. 66, No. 2, Aug. 1979, pp. 497-500, XP007901309 (4 pages).

Examination Report dated Jul. 9, 2008, issued by the UK Intellectual Property Office in Application No. GB0700524.2 (2 pages).

Office Action dated May 26, 2009 issued by the German Patent and Trademark Office in Application No. 11205001672.2 (7 pages).

Office Action dated Apr. 3, 2009 issued by The Patent Office of the State Intellectual Office of the People's Republic of China in Application No. 200580023727.0 (25 pages).

Notice of Preliminary Rejection dated May 24, 2008 issued by the Korean Intellectual Property Office in Application No. 2007-7003426 (3 pages).

Notice of Preliminary Rejection dated Feb. 26, 2008 issued by the Korean Intellectual Property Office in Application No. 10-2007-7001023 (6 pages).

International Preliminary Report on Patentability and Written Opinion dated Jan. 16, 2007, issued in PCT/US2005/024251 (6 pages).

International Search Report dated Oct. 6, 2005 issued in PCT/US2005/024251 (2 pages).

International Preliminary Report on Patentability and Written Opinion dated Jan. 16, 2007, issued in PCT/US2005/024253 (6 pages).

International Search Report dated Sep. 18, 2006 issued in PCT/US2005/024253 (6 pages).

International Preliminary Report on Patentability and Written Opinion dated Jan. 16, 2007, issued in PCT/US2005/024374 (6 pages).

International Search Report dated Sep. 18, 2006, issued in PCT/US2005/024374 (5 pages).

International Preliminary Report on Patentability and Written Opinion dated Jan. 16, 2007, issued in PCT/US2005/024486 (6 pages).

International Search Report dated Sep. 18, 2006, issued in PCT/US2005/024486 (5 pages).

* cited by examiner

US 8,660,266 B2

METHOD OF DELIVERING DIRECT PROOF PRIVATE KEYS TO DEVICES USING AN ON-LINE SERVICE

CROSS-REFERENCE TO RELATED APPLICATIONS

This application is a continuation of U.S. patent application Ser. No. 10/892,256, filed on Jul. 14, 2004 now U.S. Pat. No. 7,697,691.

BACKGROUND

1. Field

The present invention relates generally to computer security and, more specifically, to securely distributing cryptographic keys to devices in processing systems.

2. Description

Some processing system architectures supporting content protection and/or computer security features require that specially-protected or "trusted" software modules be able to create an authenticated encrypted communications session with specific protected or "trusted" hardware devices in the processing system (such as graphics controller cards, for example). One commonly used method for both identifying the device and simultaneously establishing the encrypted communications session is to use a one-side authenticated Diffie-Hellman (DH) key exchange process. In this process, the device is assigned a unique public/private Rivest, Shamir and Adelman (RSA) algorithm key pair or a unique Elliptic Curve Cryptography (ECC) key pair. However, because this authentication process uses RSA or ECC keys, the device then has a unique and provable identity, which can raise privacy concerns. In the worst case, these concerns may result in a lack of support from original equipment manufacturers (OEMs) for building trustable devices providing this kind of security.

BRIEF DESCRIPTION OF THE DRAWINGS

The features and advantages of the present invention will become apparent from the following detailed description of the present invention in which.

DETAILED DESCRIPTION

Figure 1:
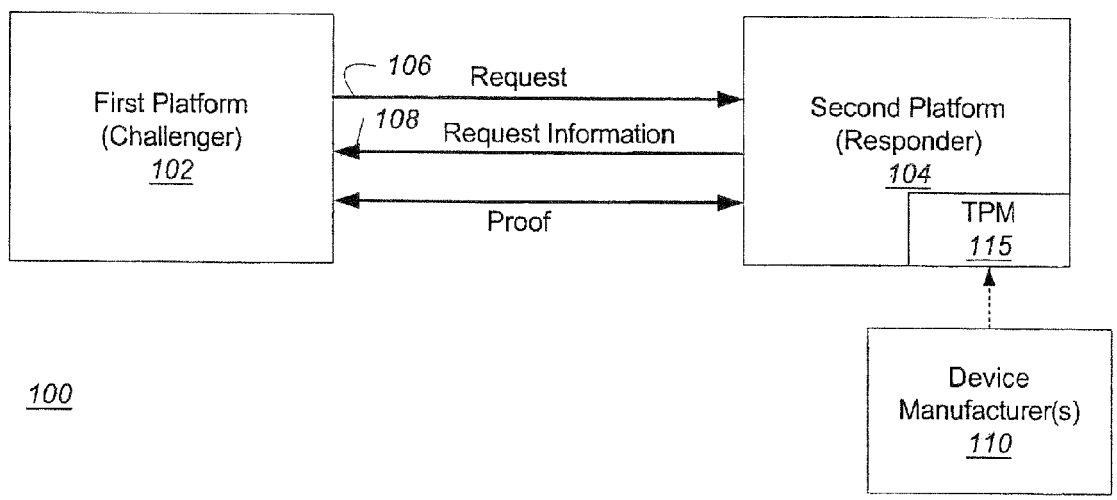
FIG. 1 illustrates a system featuring a platform implemented with a Trusted Platform Module (TPM) that operates in accordance with one embodiment of the invention.

Using the Direct Proof-based Diffie-Hellman key exchange protocol to permit protected/trusted devices to authenticate themselves and to establish an encrypted communication session with trusted software modules avoids creating any unique identity information in the processing system, and thereby avoids introducing privacy concerns. However, directly embedding a Direct Proof private key in a device on a manufacturing line requires more protected non-volatile storage on the device than other approaches, increasing device costs. An embodiment of the present invention is a method to allow the Direct Proof (DP) private key (e.g., used for signing) to be delivered in a secure manner to the device using an on-line service, and subsequently installed in the device by the device itself. The method presented in this invention is designed so that the device does not need to reveal identity information for the installation process. In one embodiment, the reduction in device storage required to support this capability may be from approximately 300 to 700 bytes down to approximately 40 bytes. This reduction in the amount of non-volatile storage required to implement Direct Proof-based Diffie-Hellman key exchange for devices may result in broader adoption of this technique.

In embodiments of the present invention, DP private signing keys are not distributed in or with a device. Instead, the device supports a protocol by which the device in the field may safely retrieve its private key from an on-line protected server provided by a manufacturer or vendor, or a delegate. This protocol creates a trusted channel between the device and the server, and does not require trust in any intervening software, including software on a local processing system.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In the following description, certain terminology is used to describe certain features of one or more embodiments of the invention. For instance, "platform" is defined as any type of communication device that is adapted to transmit and receive information. Examples of various platforms include, but are not limited or restricted to computer systems, personal digital assistants, cellular telephones, set-top boxes, facsimile machines, printers, modems, routers, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "challenger" refers to any entity (e.g., person, platform, system, software, and/or device) that requests some verification of authenticity or authority from another entity. Normally, this is performed prior to disclosing or providing the requested information. A "responder" refers to any entity that has been requested to provide some proof of its authority, validity, and/or identity. A "device manufacturer," which may be used interchangeably with "certifying manufacturer," refers to any entity that manufactures or configures a platform or device.

As used herein, to "prove" or "convince" a challenger that a responder has possession or knowledge of some cryptographic information (e.g., digital signature, a secret such as a key, etc.) means that, based on the information and proof disclosed to the challenger, there is a high probability that the responder has the cryptographic information. To prove this to a challenger without "revealing" or "disclosing" the cryptographic information to the challenger means that, based on the information disclosed to the challenger, it would be computationally infeasible for the challenger to determine the cryptographic information.

Such proofs are hereinafter referred to as direct proofs. The term "direct proof" refers to zero-knowledge proofs, as these types of proofs are commonly known in the field. In particular, a specific Direct Proof protocol as referenced herein is the subject of co-pending patent application Ser. No. 10/306,336, filed on Nov. 27, 2002, entitled "System and Method for Establishing Trust Without Revealing Identity," assigned to the owner of the present application. Direct Proof defines a protocol in which an issuer defines a family of many members that share common characteristics as defined by the issuer. The issuer generates a Family public and private key pair (Fpub and Fpri) that represents the family as a whole. Using Fpri, the issuer can also generate a unique Direct Proof private signing key (DPpri) for each individual member in the family. Any message signed by an individual DPpri can be verified using the family public key Fpub. However, such verification only identifies that the signer is a member of the family; no uniquely identifying information about the individual member is exposed. In one embodiment, the issuer may be a device manufacturer or delegate. That is, the issuer may be an entity with the ability to define device Families based on shared characteristics, generate the Family public/private key pair, and to create and inject DP private keys into devices. The issuer may also generate certificates for the Family public key that identify the source of the key and the characteristics of the device family.

Referring now to FIG. 1, an embodiment of a system featuring a platform implemented with a trusted hardware device (referred to as "Trusted Platform Module" or "TPM") that operates in accordance with one embodiment of the invention is shown. A first platform 102 (Challenger) transmits a request 106 that a second platform 104 (Responder) provides information about itself. In response to request 106, second platform 104 provides the requested information 108.

Additionally, for heightened security, first platform 102 may need to verify that requested information 108 came from a device manufactured by either a selected device manufacturer or a selected group of device manufacturers (hereinafter referred to as "device manufacturer(s) 110"). For instance, for one embodiment of the invention, first platform 102 challenges second platform 104 to show that it has cryptographic information (e.g., a signature) generated by device manufacturer(s) 110. The challenge may be either incorporated into request 106 (as shown) or a separate transmission. Second platform 104 replies to the challenge by providing information, in the form of a reply, to convince first platform 102 that second platform 104 has cryptographic information generated by device manufacturer(s) 110, without revealing the cryptographic information. The reply may be either part of the requested information 108 (as shown) or a separate transmission.

In one embodiment of the invention, second platform 104 comprises a Trusted Platform Module (TPM) 115. TPM 115 is a cryptographic device that is manufactured by device manufacturer(s) 110. In one embodiment of the invention, TPM 115 comprises a processor with a small amount of on-chip memory encapsulated within a package. TPM 115 is configured to provide information to first platform 102 that would enable it to determine that a reply is transmitted from a valid TPM. The information used is content that would not make it likely that the TPM's or second platform's identity can be determined.

Figure 2:
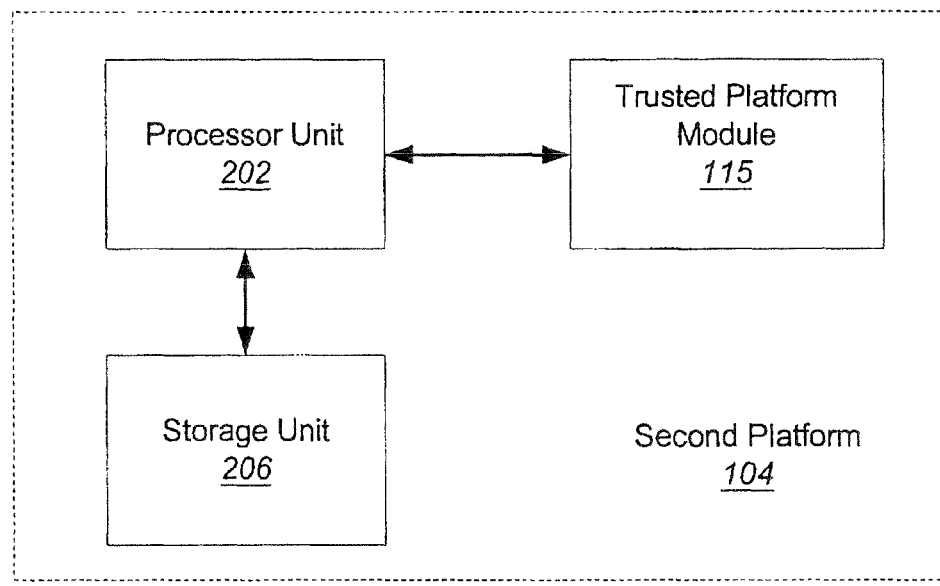
FIG. 2 illustrates a first embodiment of the platform including the TPM of FIG. 1.

FIG. 2 illustrates a first embodiment of second platform 104 with TPM 115. For this embodiment of the invention, second platform 104 comprises a processor 202 coupled to TPM 115. In general, processor 202 is a device that processes information. For instance, in one embodiment of the invention, processor 202 may be implemented as a microprocessor, digital signal processor, micro-controller or even a state machine. Alternatively, in another embodiment of the invention, processor 202 may be implemented as programmable or hard-coded logic, such as Field Programmable Gate Arrays (FPGAs), transistor-transistor logic (TTL) logic, or even an Application Specific Integrated Circuit (ASIC).

Figure 3:
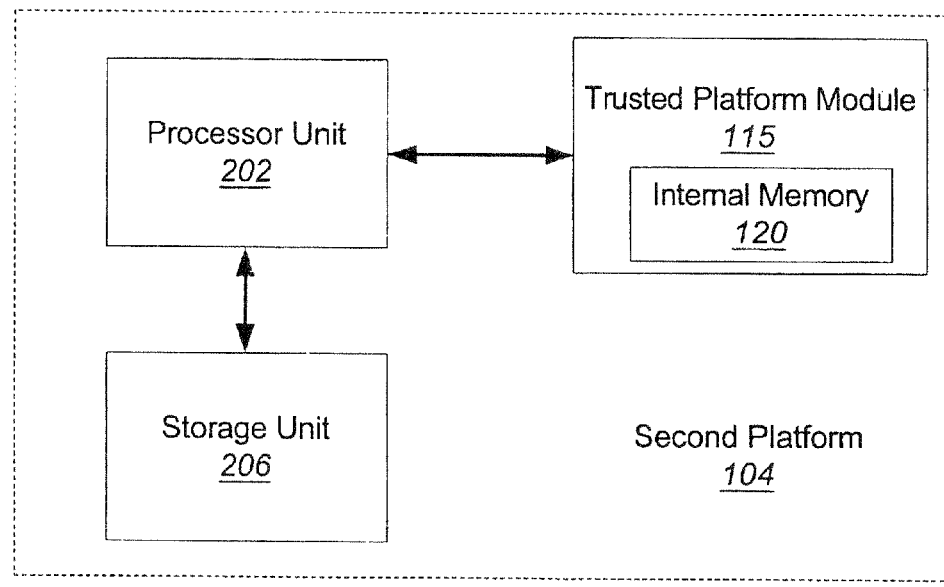
FIG. 3 illustrates a second embodiment of the platform including the TPM of FIG. 1.

Herein, second platform 104 further comprises a storage unit 206 to permit storage of cryptographic information such as one or more of the following: keys, hash values, signatures, certificates, etc. A hash value of "X" may be represented as "Hash(X)". It is contemplated that such information may be stored within internal memory 220 of TPM 115 in lieu of storage unit 206 as shown in FIG. 3. The cryptographic information may be encrypted, especially if stored outside TPM 115.

Figure 4:
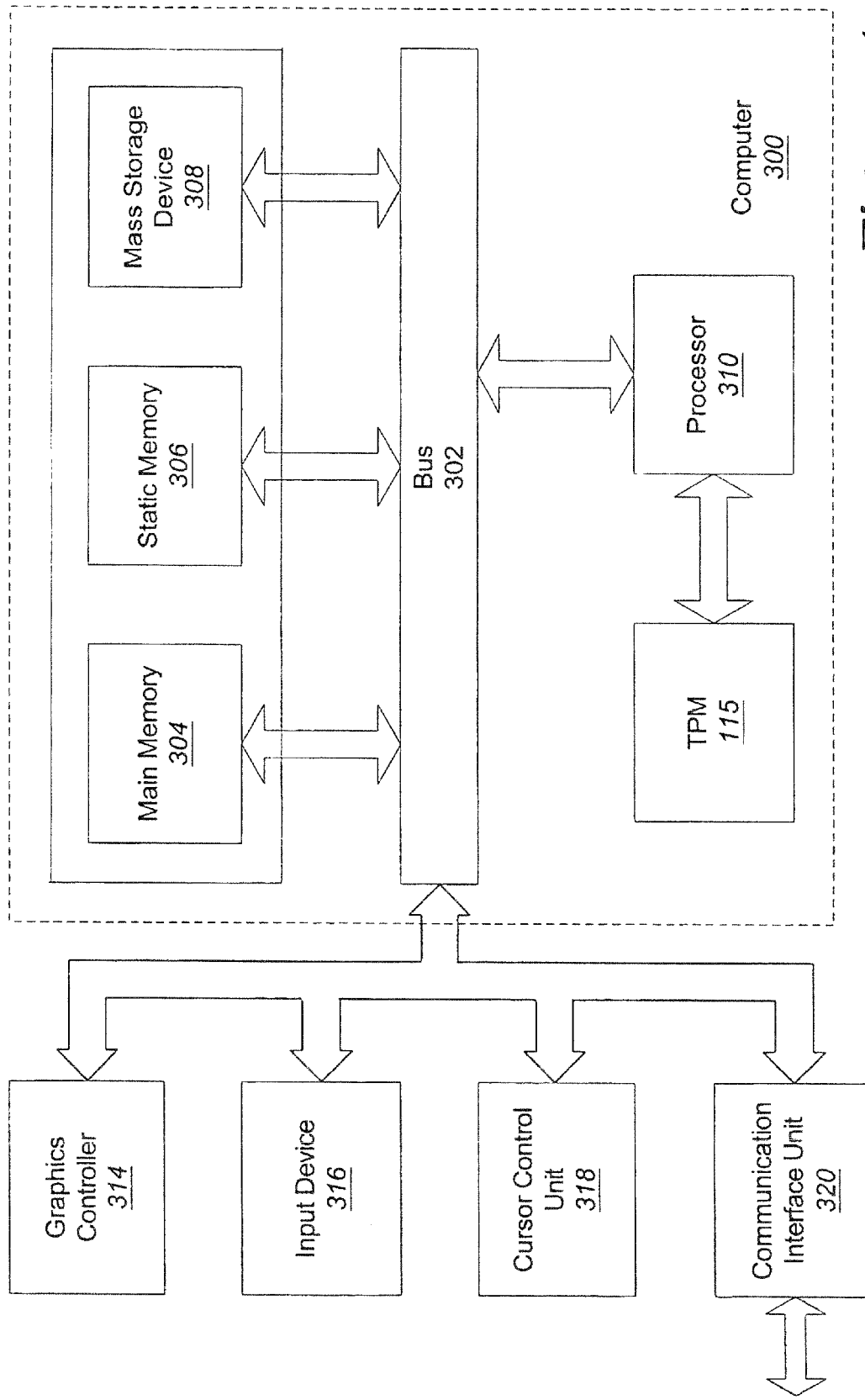
FIG. 4 illustrates an exemplary embodiment of a computer system implemented with the TPM of FIG. 2.

FIG. 4 illustrates an embodiment of a platform including a computer system 300 implemented with TPM 115 of FIG. 2. Computer system 300 comprises a bus 302 and a processor 310 coupled to bus 302. Computer system 300 further comprises a main memory unit 304 and a static memory unit 306.

Herein, main memory unit 304 is volatile semiconductor memory for storing information and instructions executed by processor 310. Main memory 304 also may be used for storing temporary variables or other intermediate information during execution of instructions by processor 310. Static memory unit 306 is non-volatile semiconductor memory for storing information and instructions for processor 310 on a more permanent nature. Examples of static memory 306 include, but are not limited or restricted to read only memory (ROM). Both main memory unit 304 and static memory unit 306 are coupled to bus 302.

In one embodiment of the invention, computer system 300 further comprises a data storage device 308 such as a magnetic disk or optical disc and its corresponding drive may also be coupled to computer system 300 for storing information and instructions.

Computer system 300 can also be coupled via bus 302 to a graphics controller device 314, which controls a display (not shown) such as a cathode ray tube (CRT), Liquid Crystal Display (LCD) or any flat panel display, for displaying information to an end user. In one embodiment, it may be desired for the graphics controller to be able to establish an authenticated encrypted communications session with a software module being executed by the processor.

Typically, an alphanumeric input device 316 (e.g., keyboard, keypad, etc.) may be coupled to bus 302 for communicating information and/or command selections to processor 310. Another type of user input device is cursor control unit 318, such as a mouse, a trackball, touch pad, stylus, or cursor direction keys for communicating direction information and command selections to processor 310 and for controlling cursor movement on display 314.

A communication interface unit 320 is also coupled to bus 302. Examples of interface unit 320 include a modem, a network interface card, or other well-known interfaces used for coupling to a communication link forming part of a local or wide area network. In this manner, computer system 300 may be coupled to a number of clients and/or servers via a conventional network infrastructure, such as a company's Intranet and/or the Internet, for example. In one embodiment, the computer system may be coupled on-line over a network to a protected server.

It is appreciated that a lesser or more equipped computer system than described above may be desirable for certain implementations. Therefore, the configuration of computer system 300 will vary from implementation to implementation depending upon numerous factors, such as price constraints, performance requirements, technological improvements, and/or other circumstances.

In at least one embodiment, computer system 300 may support the use of specially-protected "trusted" software modules (e.g., tamper-resistant software, or systems having the ability to run protected programs) stored in main memory 304 and/or mass storage device 308 and being executed by processor 310 to perform specific activities, even in the presence of other hostile software in the system. Some of these trusted software modules require equivalently "trustable" protected access not just to other platforms, but to one or more peripheral devices within the same platform, such as graphics controller 314. In general, such access requires that the trusted software module be able to identify the device's capabilities and/or specific identity, and then establish an encrypted session with the device to permit the exchange of data that cannot be snooped or spoofed by other software in the system.

One prior art method of both identifying the device and simultaneously establishing the encrypted session is to use a one-side authenticated Diffie-Hellman (DH) key exchange process. In this process, the device is assigned a unique public/private RSA or ECC key pair. The device holds and protects the private key, while the public key, along with authenticating certificates, may be released to the software module. During the DH key exchange process, the device signs a message using its private key, which the software module can verify using the corresponding public key. This permits the software module to authenticate that the message did in fact come from the device of interest.

However, because this authentication process uses RSA or ECC keys, the device has a unique and provable identity. Any software module that can get the device to sign a message with its private key can prove that this specific unique device is present in the computer system. Given that devices rarely migrate between processing systems, this also represents a provable unique computer system identity. Furthermore, the device's public key itself represents a constant unique value; effectively a permanent "cookie." In some cases, these characteristics may be construed as a significant privacy problem.

One alternative approach is described in co-pending patent application Ser. No. 10/999,576, filed on Nov. 30, 2004, entitled "An Apparatus and Method for Establishing an Authenticated Encrypted Session with a Device Without Exposing Privacy-Sensitive Information," assigned to the owner of the present application. In that approach, the use of RSA or ECC keys in the one-sided authenticated Diffie-Hellman process is replaced with Direct Proof keys. A device using this approach may be authenticated as belonging to a specific Family of devices, which may include assurances about the behavior or trustworthiness of the device. The approach does not expose any uniquely identifying information that could be used to establish a unique identity representing the processing system.

Although this approach works well, it requires additional storage in the device to hold the Direct Proof private key, which may be larger than a RSA or ECC key. To alleviate the burdens of this additional storage requirement, embodiments of the present invention define a system and process for ensuring that the device has the Direct Proof private key when it needs the key, without requiring substantial additional storage in the device.

Figure 5:
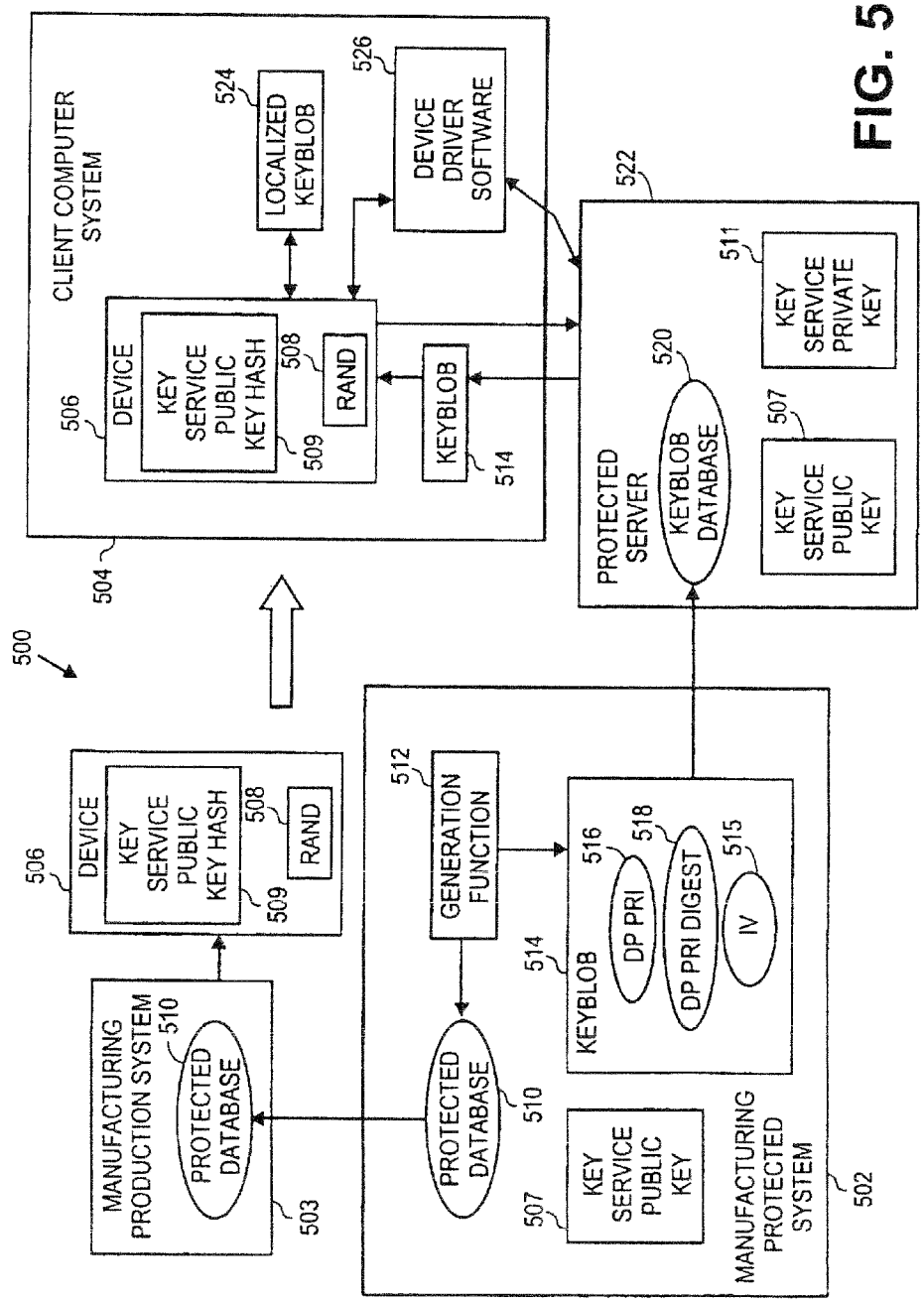
FIG. 5 is a diagram of a system for distributing Direct Proof keys to devices using an on-line service according to an embodiment of the present invention.

In at least one embodiment of the present invention, a device manufacturer stores a 128-bit pseudorandom number into a device in the manufacturing line, and a much larger Direct Proof private key (DPpri) may be encrypted and delivered to the device in the field using an on-line service operated by a protected server. Other embodiments may store a number into the device that is longer or shorter than 128 bits. This process ensures that only a specified device can decrypt and use its assigned DPpri key. FIG. 5 is a diagram of a system 500 for distributing Direct Proof keys according to an embodiment of the present invention. There are four entities in this system, a device manufacturing protected system 502, a device manufacturing production system 503, a client computer system 504, and a protected server 522. The device manufacturing protected system comprises a processing system used in the set-up process prior to manufacturing of a device 506. The manufacturing protected system 502 may be operated by a device manufacturer such that the protected system is protected from attack from hackers outside the device manufacturing site (e.g., it is a closed system). Manufacturing production system 503 may be used in the manufacturing of the devices. In one embodiment, the protected system and the production system may be the same system. Device 506 comprises any hardware device for inclusion in the client computer system (e.g., a memory controller, a peripheral device such as a graphics controller, an I/O device, etc.). In embodiments of the present invention, the device comprises a pseudorandom value RAND 508, and a key service public key hash value 509, stored in non-volatile storage of the device.

The manufacturing protected system includes a protected database 510 and a generation function 512. The protected database comprises a data structure for storing multiple pseudorandom values (at least as many as one per device to be manufactured) generated by generation function 512 in a manner as described below. The generation function comprises logic (either implemented in software or hardware) to generate a data structure called a keyblob 514 herein. Keyblob 514 comprises at least three data items. A unique Direct Proof private key (DPpri) comprises a cryptographic key which may be used by a device for signing. DP private digest 518 (DPpri Digest) comprises a message digest of DPpri 516 according to any well-known method of generating a secure message digest, such as SHA-1. Some embodiments may include a pseudorandom initialization vector (IV) 515 comprising a bit stream as part of the keyblob for compatibility purposes. If a stream cipher is used for the encryption, then the IV is used in a well known method for using an IV in a stream cipher. If a block cipher is used for the encryption, then the IV will be used as part of the message to be encrypted, thus making each instance of the encryption be different. The manufacturing protected system also includes a key service public key 507 used for an on-line protocol as described in further detail below.

In embodiments of the present invention, the manufacturing protected system generates one or more keyblobs (as described in detail below) and stores the keyblobs in a keyblob database 520 on a protected server 522. In one embodiment, there may be many keyblobs in the keyblob database. The protected server may be operated by the device manufacturer, device distributor, or other affiliated entity. The protected server may be communicatively coupled to a client computer system 504 using a network, such as the Internet for example. The protected server also includes a key service private key 511 for use in the on-line protocol between the protected server and the device.

A client computer system 504 desiring to use a Direct Proof protocol for authentication and key exchange of a communications session with device 506 included within system 504 may read a selected keyblob 514 out of the keyblob database 520 on the protected server using a key service public/private key pair and the on-line protocol described in further detail below. The keyblob data may be used by the device to generate a localized keyblob 524 (as described below) for use in implementing the Direct Proof protocol. Device driver software 526 is executed by the client computer system to initialize and control device 506.

Figure 6:
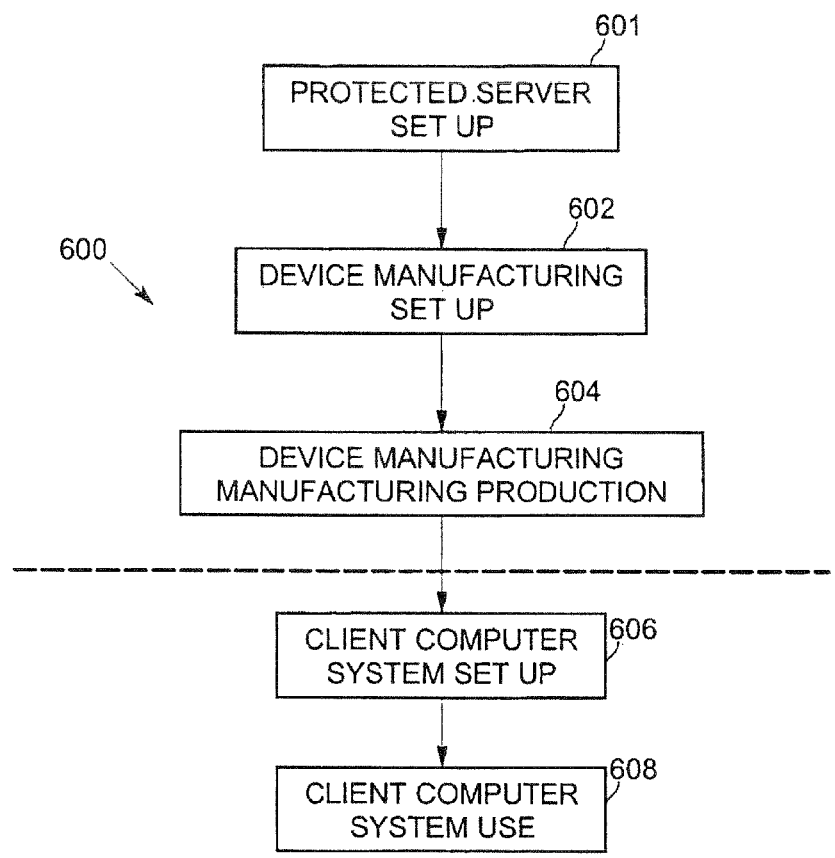
FIG. 6 is a flow diagram illustrating stages of a method of distributing Direct Proof keys using an on-line service according to an embodiment of the present invention.

In embodiments of the present invention, there may be five distinct stages of operation. FIG. 6 is a flow diagram 600 illustrating stages of a method of distributing Direct Proof keys according to an embodiment of the present invention. According to embodiments of the present invention, certain actions may be performed at each stage. At a site of a device manufacturer, there are at least three stages: protected server set-up stage 601, device manufacturer set-up stage 602, and device manufacturer production stage 604. The protected server set-up stage is described herein with reference to FIG. 7. The device manufacturer set-up stage is described herein with reference to FIG. 8. The device manufacturer production stage is described herein with reference to FIG. 9. At a consumer site having the client computer system, there are at least two stages: client computer system set-up stage 606, and client computer system use stage 608. The client computer system set-up stage is described herein with reference to FIGS. 10-12. The client computer system use stage is described herein with reference to FIG. 13.

Figure 7:
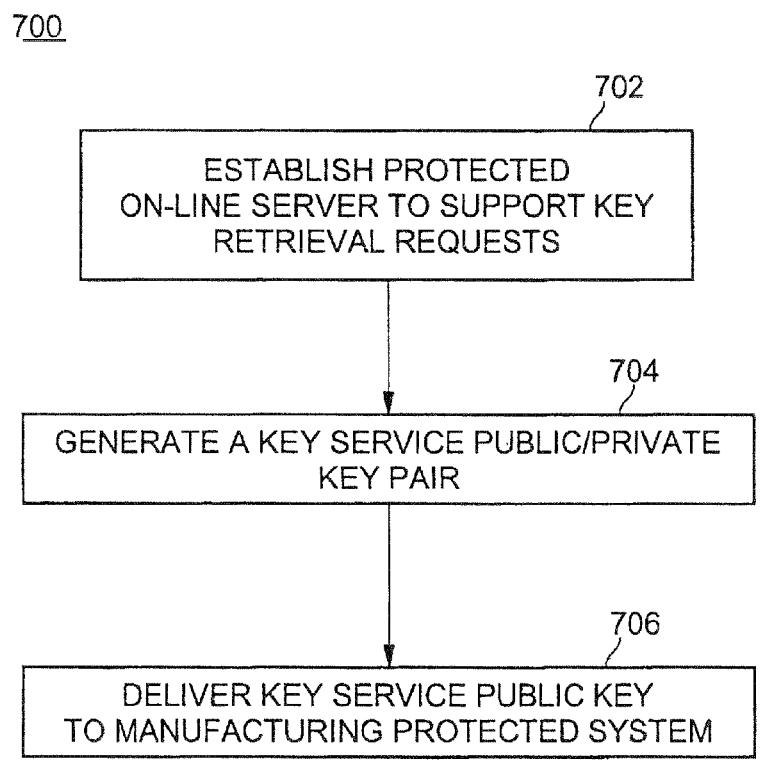
FIG. 7 is a flow diagram illustrating protected server set-up processing according to an embodiment of the present invention.

FIG. 7 is a flow diagram 700 illustrating protected server set-up stage processing according to an embodiment of the present invention. This processing may be performed by a device manufacturer prior to production of devices. At block 702, a device manufacturer establishes a protected server 522 to support key retrieval requests. In one embodiment, the protected server is communicatively coupled to the Internet in a well-known manner. For improved security, the protected server should not be the same processing system used in the manufacturing protected system or the manufacturing production system. At block 704, the device manufacturer generates a key service public/private key pair that will be used for the key retrieval service provided by the protected server. In one embodiment, the key service public/private key pair may be stored in the protected server. This key pair may be generated once for all processing performed by the system, or a new key pair may be generated for each class of devices. At block 706, the device manufacturer delivers the key service public key 507 to the manufacturing protected system 502.

Figure 8:
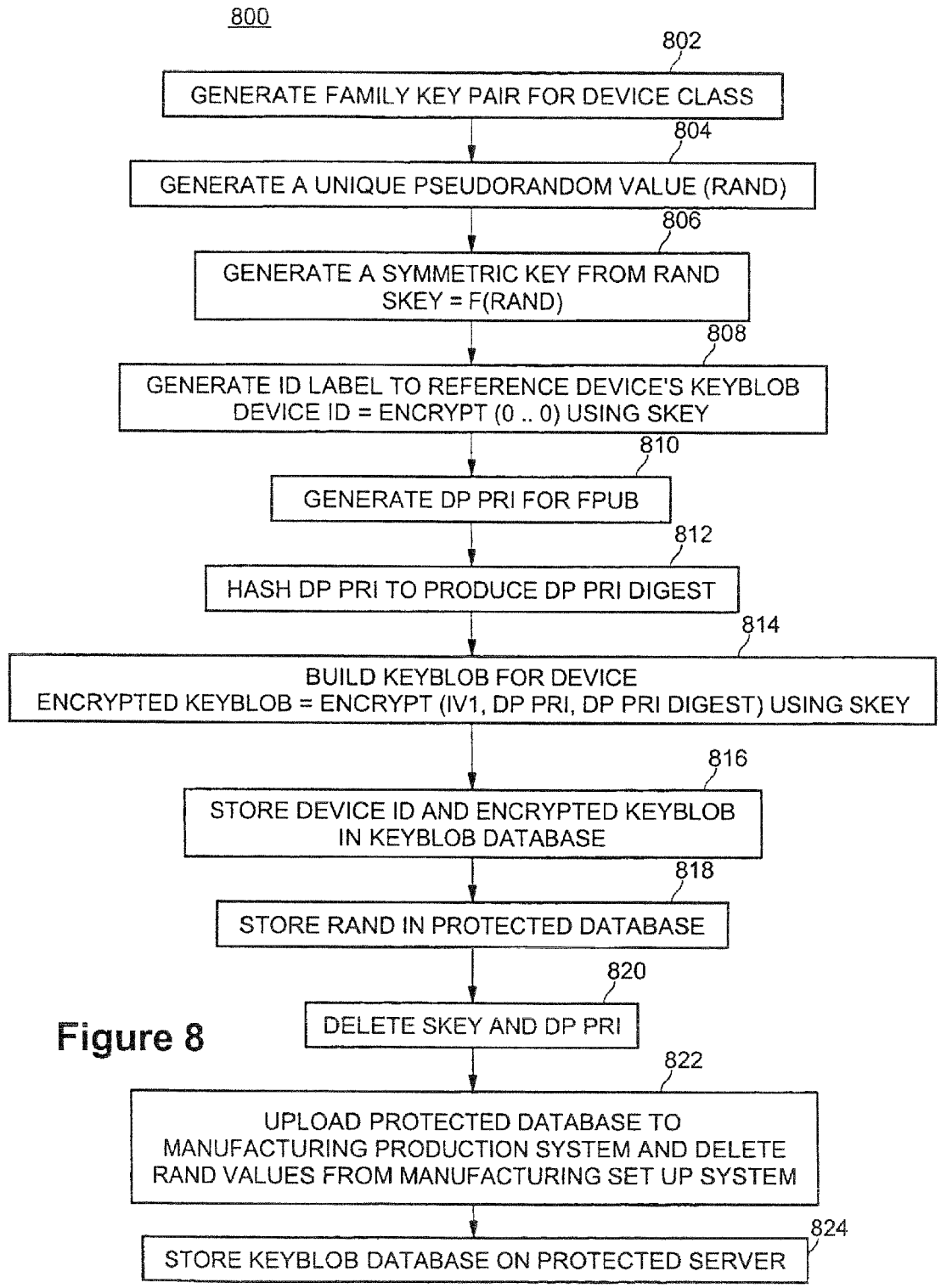
FIG. 8 is a flow diagram illustrating device manufacturer set-up processing according to an embodiment of the present invention.

FIG. 8 is a flow diagram 800 illustrating device manufacturing set-up processing according to an embodiment of the present invention. In one embodiment, a device manufacturer may perform these actions using a manufacturing protected system 502. At block 802, the device manufacturer generates a Direct Proof Family key pair (Fpub and Fpri) for each class of devices to be manufactured. Each unique device will have a DPpri key such that a signature created using DPpri may be verified by Fpub. A class of devices may comprise any set or subset of devices, such as a selected product line (i.e., type of device) or subsets of a product line based on version number, or other characteristics of the devices. The Family key pair is for use by the class of devices for which it was generated.

For each device to be manufactured, generation function 512 of manufacturing protected system 502 performs blocks 804 to 820. First, at block 804, the generation function generates a unique pseudo-random value (RAND) 508. In one embodiment, the length of RAND is 128 bits. In other embodiments, other sizes of values may be used. In one embodiment, the pseudo-random values for a number of devices may be generated in advance. At block 806, using a one-way function, f, supported by the device, the generation function generates a symmetric encryption key SKEY from the unique RAND value (SKEY=f(RAND)). The one-way function may be any known algorithm appropriate for this purpose (e.g., SHA-1, MGF1, Data Encryption Standard (DES), Triple DES, Advanced Encryption Standard (AES), etc.). At block 808, in one embodiment, the generation function generates an identifier (ID) label that will be used to reference this device's keyblob 514 in the keyblob database 520 on the protected server 522, by using SKEY to encrypt a "null entry" (e.g., a small number of zero bytes) (Device ID=Encrypt (0 . . . 0) using SKEY. In other embodiments, other ways of generating the Device ID may be used or other values may be encrypted by SKEY.

Next, at block 810, the generation function generates the DP private signing key DPpri correlating to the device's Family public key (Fpub). At block 812, the generation function hashes DPpri to produce DPpri Digest using known methods (e.g., using SHA-1 or another hash algorithm). At block 814, the generation function builds a keyblob data structure for the device. The keyblob includes at least DPpri and DPpri Digest. In one embodiment, the keyblob also includes a random initialization vector having a plurality of pseudo-randomly generated bits. These values may be encrypted using SKEY to produce an encrypted keyblob 514. At block 816, the Device ID generated at block 808 and the encrypted keyblob 514 generated at block 814 may be stored in an entry in a keyblob database 520. In one embodiment, the entry in the keyblob database may be indicated by the Device ID. At block 818, the current RAND value may be stored in protected database 510. At block 820, SKEY and DPpri may be deleted, since they will be regenerated by the device in the field.

The creation of the DPpri Digest and the subsequent encryption by SKEY are designed so that the contents of DPpri cannot be determined by any entity that does not have possession of SKEY and so that the contents of the KeyBlob cannot be modified by an entity that does not have possession of SKEY without subsequent detection by an entity that does have possession of SKEY. In other embodiments, other methods for providing this secrecy and integrity protection could be used. In some embodiments, the integrity protection may not be required, and a method that provided only secrecy could be used. In this case, the value of DPpri Digest would not be necessary.

At any time after block 820, at block 822 the protected database of RAND values may be securely uploaded to manufacturing production system 503 that will store the RAND values into the devices during the manufacturing process. Once this upload has been verified, the RAND values could be securely deleted from the manufacturing protected system 502. Finally, at block 824, the keyblob database 520 having a plurality of encrypted keyblobs may be stored on the protected server 522, with one keyblob database entry to be used for each device, as indexed by the Device ID field.

Figure 9:
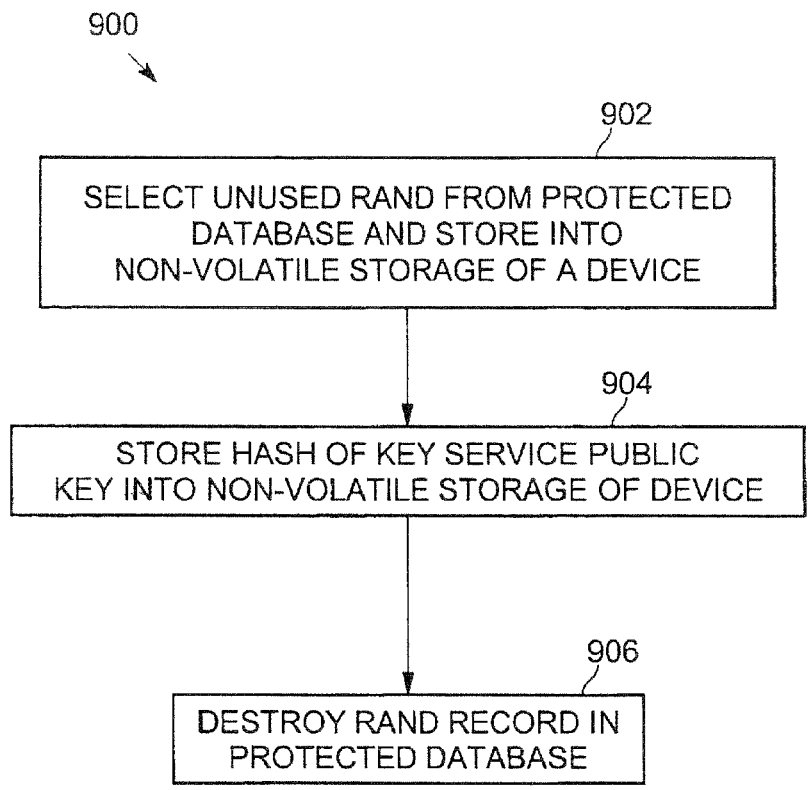
FIG. 9 is a flow diagram illustrating device manufacturer production processing according to an embodiment of the present invention.

FIG. 9 is a flow diagram 900 illustrating device manufacturing production processing according to an embodiment of the present invention. As devices are being manufacturing in a production line, at block 902 the manufacturing production system selects an unused RAND value from the protected database. The selected RAND value may then be stored into non-volatile storage in a device. In one embodiment, the non-volatile storage comprises a TPM. In one embodiment, the RAND value may be stored in approximately 16 bytes of non-volatile storage. At block 904, a hash 509 of the key service public key 507 may be stored in the non-volatile storage of the device. The hash may be generated using any known hashing algorithm. In one embodiment, the hash value may be stored in approximately 20 bytes of non-volatile storage. At block 906, once the storage of the RAND value is successful, the manufacturing production system destroys any record of that device's RAND value in the protected database 510. At this point, the sole copy of the RAND value is stored in the device.

In an alternative embodiment, the RAND value could be created during the manufacturing of a device, and then sent to the manufacturing protected system for the computation of a keyblob.

In another embodiment, the RAND value could be created on the device, and the device and the manufacturing protected system could engage in a protocol to generate the DPpri key using a method that does not reveal the DPpri key outside of the device. Then the device could create the Device ID, the SKEY, and the keyblob. The device would pass the Device ID and the keyblob to the manufacturing system for storage in protected database 510. In this method, the manufacturing system ends up with the same information (Device ID, keyblob) in the protected database, but does not know the values of RAND or of DPpri.

Figure 10:
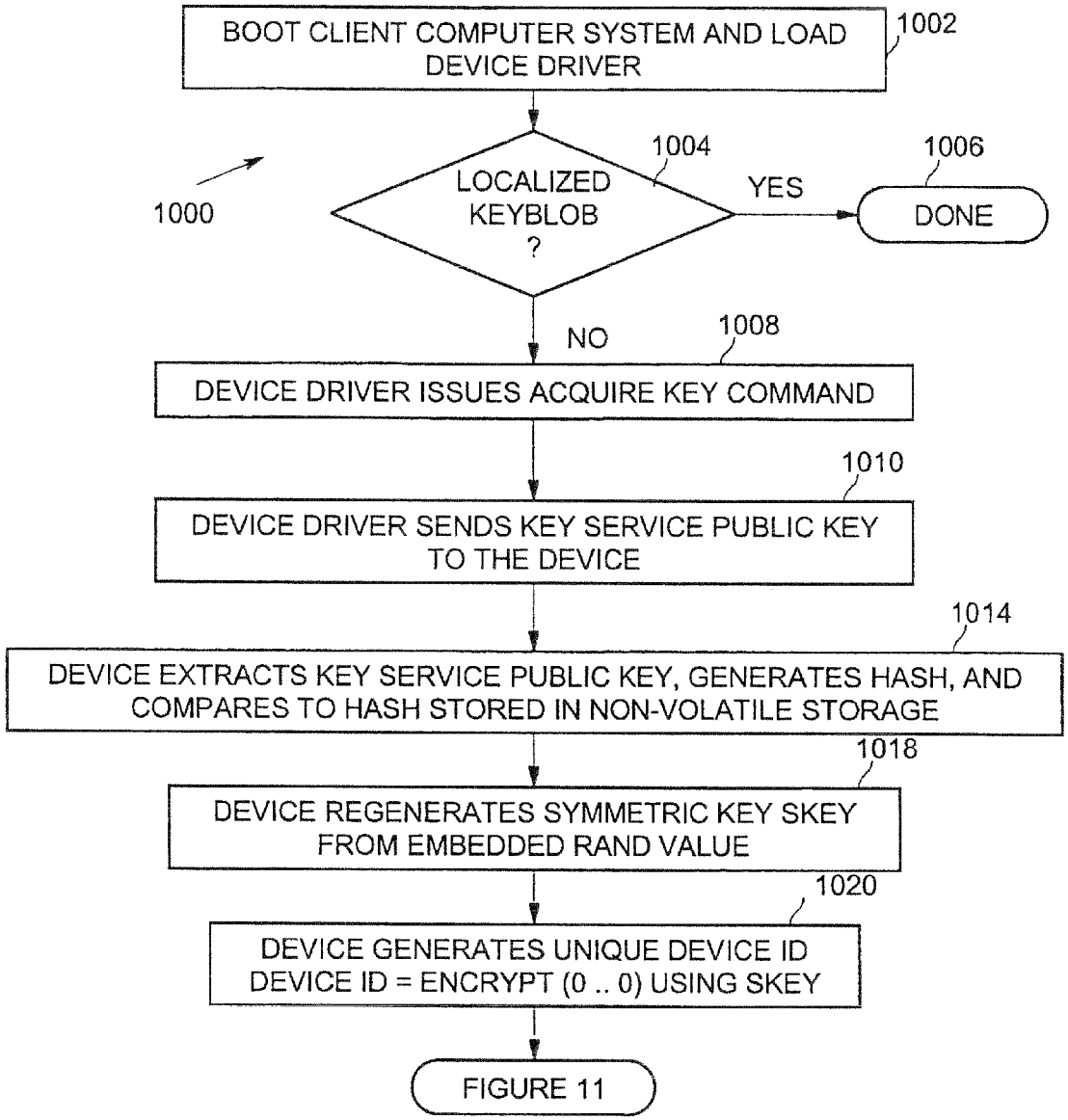
FIGS. 10-12 are flow diagrams of client computer system set-up processing according to an embodiment of the present invention.
Figure 11:
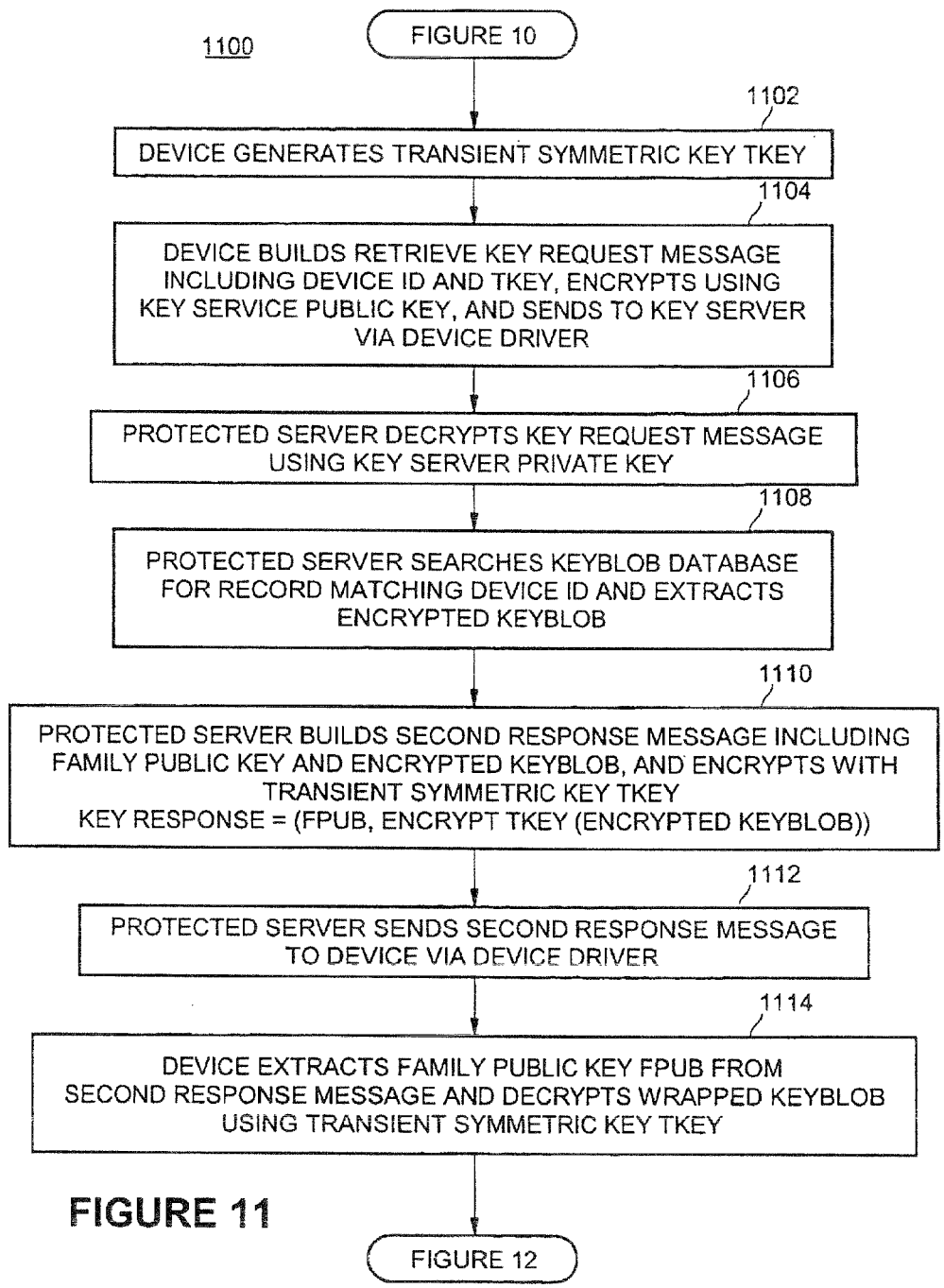
Figure 12:
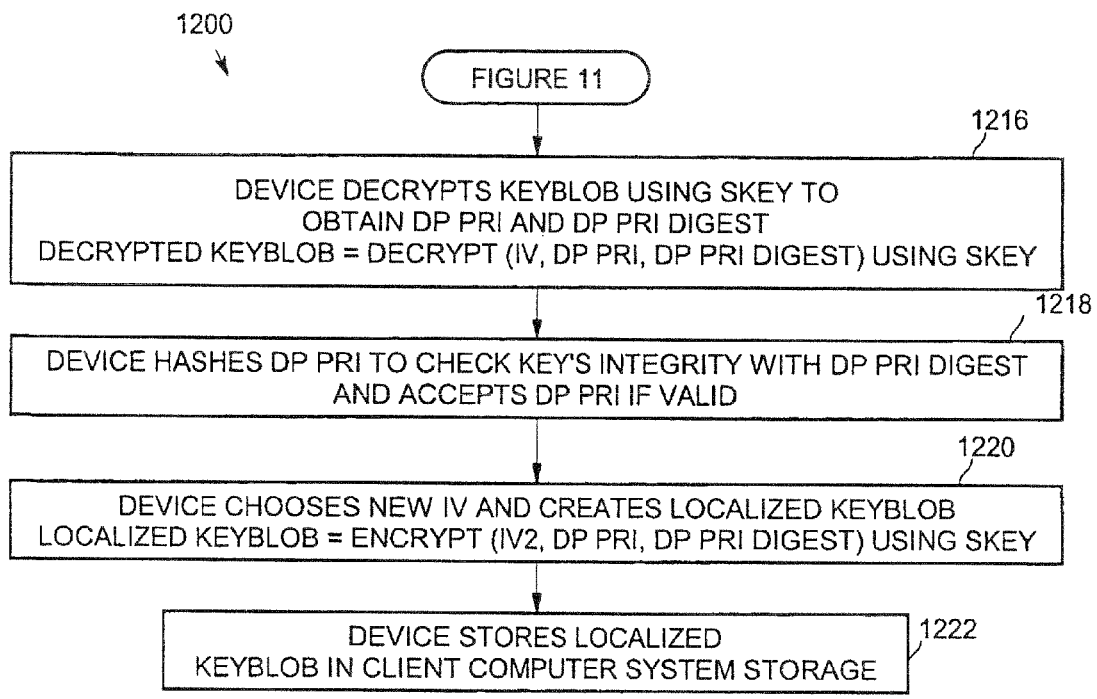

FIGS. 10-12 are flow diagrams of client computer system set-up processing according to an embodiment of the present invention. A client computer system may perform these actions as part of booting up the system. Starting with flow 1000 on FIG. 10, at block 1002, the client computer system may be booted up in the normal manner and a device driver software module 526 for the device may be loaded into main memory of the client computer system. When the device driver is initialized and begins execution, the device driver determines at block 1004 if there is already an encrypted localized keyblob 524 stored in mass storage device 308 for device 506. If there is, then no further set-up processing need be performed and set-up processing ends at block 1006. If not, then processing continues with block 1008. At block 1008, the device driver issues an Acquire Key command to the device 506 to initiate the device's DP private key acquisition process.

At block 1010, the device driver sends the key service public key 507 to the device. At block 1014, the device extracts the received key service public key, generates a hash value of the key service public key, and compares the hash of the received key service public key to the key service public key hash 509 stored in non-volatile storage on the device. If the hashes match, the received key service public key is known to be that of the device manufacturer's key retrieval service, and client computer system set-up processing continues.

In another embodiment, the device could receive a certificate of a certified key service public key for which the certificate could be verified through a certificate chain to the key service public key whose hash is the key service public key hash 509 stored in non-volatile storage on the device. Then the certified key service public key could be used as the key service public key in the subsequent steps.

At block 1013 the device uses its one-way function f to regenerate the symmetric key SKEY from the embedded RAND value 508 (SKEY=f(RAND)). At block 1020, the device then generates its unique Device ID label, by using SKEY to encrypt a "null entry" (e.g., a small number of zero bytes) (Device ID=Encrypt (0 . . . 0) using SKEY). Processing continues with flow diagram 1100 of FIG. 11.

At block 1102 of FIG. 11, the device generates a transient symmetric key Tkey. This key will be sent to the protected server, which may use the key to encrypt the message the protected server returns to the device. At block 1104, the device builds a retrieve key request message containing the Device ID and the transient symmetric key Tkey, encrypts the message using the key service public key received from the device driver at block 1014, and sends the retrieve key request message to the protected server via the device driver. (Retrieve Key Request=Encrypt (Device ID, Tkey) with the key service public key). One skilled in the art will recognize that to encrypt a message with a public key, one would typically create a session key (Skey) for a symmetric cipher, encrypt the session key with the public key, and then encrypt the message with the session key. At block 1106, the protected server decrypts the received key request message using the key service private key 511, and extracts the fields stored therein. Since the protected server now knows the Device ID (obtained from the key request message), the protected server searches the keyblob database for the record containing the matching Device ID value, and extracts the device's encrypted keyblob from the record. At block 1110, the protected server builds a second response message containing the Family public key and the encrypted keyblob and encrypts the second response message using the transient symmetric key Tkey supplied by the device. Thus, Key Response=(Family public key, Encryption of (Encrypted Keyblob) using Tkey). Encrypting the Encrypted keyblob with Tkey is not to protect the keyblob, since it is already encrypted with a symmetric key SKEY, which only the device can regenerate. Rather, encrypting the message in this way ensures that the returned keyblob changes each time the key acquisition process is performed, thus ensuring that the keyblob itself cannot be used as a "cookie." The second response message may be returned to the device driver on the client computer system at block 1112, which forwards the message to the device.

At block 1114, the device extracts the Family public key from the second response message, decrypts the wrapped keyblob using the transient symmetric key Tkey, and stores the encrypted keyblob in volatile memory of the device. Processing then continues with flow diagram 1200 of FIG. 12.

At block 1216 of FIG. 12, the device decrypts the encrypted keyblob using the symmetric key SKEY, to yield DPpri and DPpri Digest, and stores these values in its non-volatile storage (Decrypted Keyblob=Decrypt (IV, DPpri, DPpri Digest) using SKEY). The initialization vector (IV) may be discarded. At block 1218, the device then checks the integrity of DPpri by hashing DPpri and comparing the result against DPpri Digest. If the comparison is good, the device accepts DPpri as its valid key. The device may in one embodiment also set a Key Acquired flag to true to indicate that the DP private key has been successfully acquired. At block 1220, the device chooses a new IV and creates a new encrypted localized keyblob, using the new IV (Localized Keyblob=Encrypt (IV2, DPpri, DPpri Digest) using SKEY). In one embodiment, the new encrypted localized keyblob may be returned to a Key Retrieval utility software module (not shown in FIG. 5) on the client computer system. At block

1222, the Key Retrieval utility stores the encrypted, localized keyblob in storage within the client computer system (such as mass storage device 308, for example). The device's DPpri is now securely stored in the client computer system.

Figure 13:
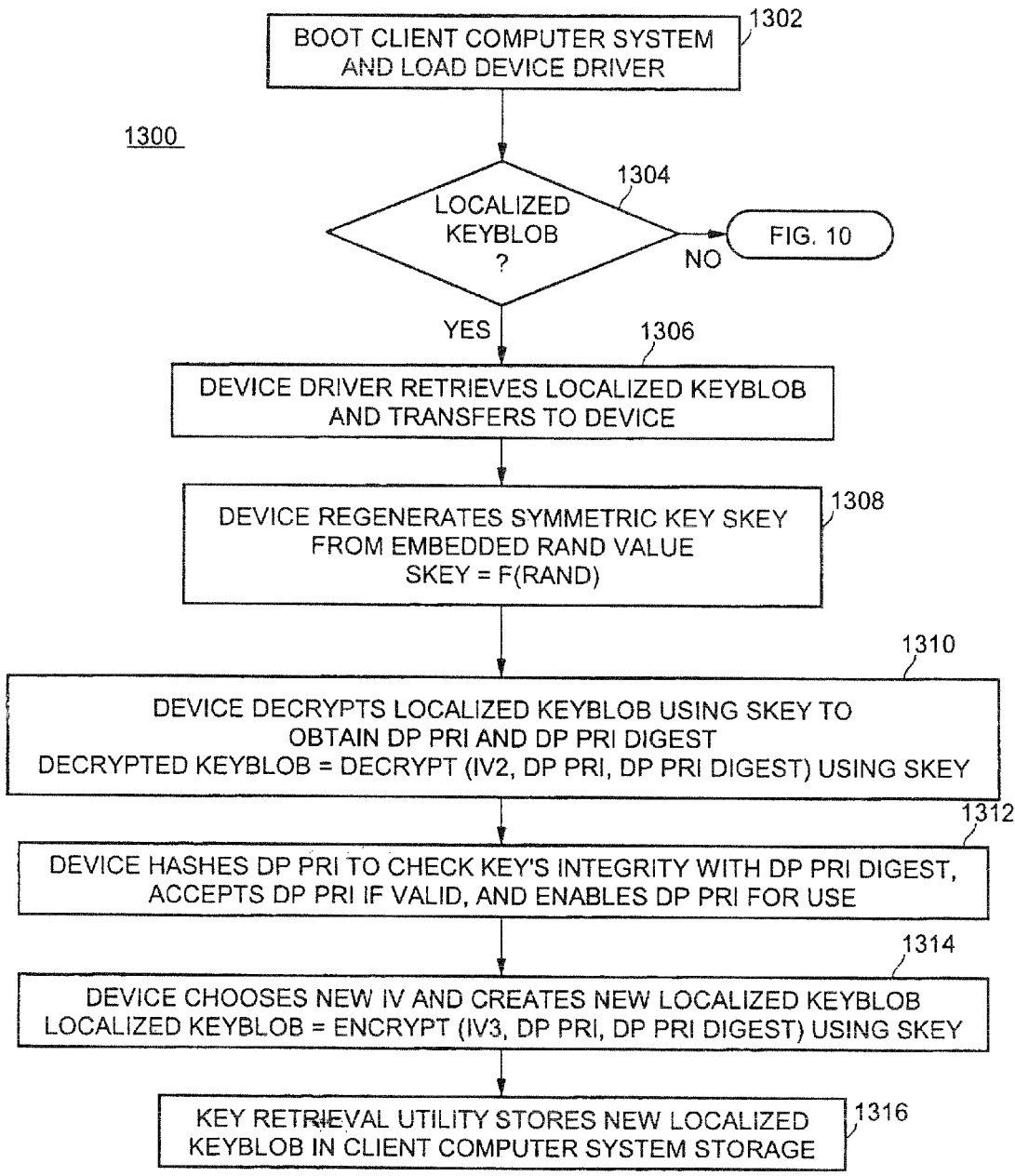
FIG. 13 is a flow diagram of client computer system processing according to an embodiment of the present invention.

Once the device has acquired DPpri during set-up processing, the device may then use DPpri. FIG. 13 is a flow diagram 1300 of client computer system processing according to an embodiment of the present invention. The client computer system may perform these actions anytime after set-up has been completed. At block 1302, the client computer system may be booted up in the normal manner and a device driver 526 for the device may be loaded into main memory. When the device driver is initialized and begins execution, the device driver determines if there is already an encrypted localized keyblob 524 stored in mass storage device 308 for device 506. If there is not, then the set-up processing of FIGS. 10-12 is performed. If there is an encrypted localized keyblob available for this device, then processing continues with block 1306. At block 1306, the device driver retrieves the encrypted localized keyblob and transfers the keyblob to the device. In one embodiment, the transfer of the keyblob may be accomplished by executing a Load Keyblob command.

At block 1308 the device uses its one-way function f to regenerate the symmetric key SKEY (now for use in decryption) from the embedded RAND value 508 (SKEY=f (RAND)). At block 1310, the device decrypts the encrypted localized keyblob using the symmetric key SKEY, to yield DPpri and DPpri Digest, and stores these values in its non-volatile storage (Decrypted Keyblob-Decrypt (IV2, DPpri, DPpri Digest) using SKEY). The second initialization vector (IV2) may be discarded. At block 1312, the device checks the integrity of DPpri by hashing DPpri and comparing the result against DPpri Digest. If the comparison is good (e.g., the digests match), the device accepts DPpri as the valid key acquired earlier, and enables it for use. The device may also set a Key Acquired flag to true to indicate that the DP private key has been successfully acquired. At block 1314, the device chooses yet another IV and creates a new encrypted localized keyblob, using the new IV (Localized Keyblob=Encrypt (IV3, DPpri, DPpri Digest) using SKEY). The new encrypted localized keyblob may be returned to the Key Retrieval utility. At block 1316, the Key Retrieval utility stores the encrypted, localized keyblob in storage within the client computer system (such as mass storage device 308, for example). The device's DPpri is now securely stored once again in the client computer system.

In one embodiment of the present invention, it is not necessary to generate all of the device DP private keys at one time. Assuming that the keyblob database on the protected server is updated regularly, the device DP private keys could be generated in batches as needed. Each time the keyblob database is updated on the protected server, it would contain the keyblob database as generated to date, including those device keys that had been generated but not yet assigned to devices.

In another embodiment, it may be possible to delay the generation of the device's DPpri key, allowing these keys to be generated only for those devices that require them. Upon receipt of the first key acquisition request from the device, the protected sever may generate a request to the manufacturing protected system, which still holds the device's RAND value. At this time, the manufacturing protected system generates the DPpri key for the device, returns it to the protected server, and only then destroys the RAND value.

In another embodiment, instead of storing the key service public key hash in non-volatile storage on the device, the device manufacturer may choose to store the hash of a root key, and then sign certificates for key service public keys with the root key. In this way, the same root key could be used for a very large number of devices.

Although the operations discussed herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
storing, in a memory of a processor-based device, a family public key for use by said device, as well as a group of other devices, said family public key paired with a family private key not stored on said device; and
enabling a message signed with a direct proof private signing key, derived from said private signing key, to be verified by a member of said group using said family public key without revealing a member's identity.

2. The method of claim 1 comprising:
generating a key service public/private key pair for use in secure key retrieval processing by a client computer system and storing the key service public/private key pair in a protected on-line server;
generating a pseudo-random value for a device; and
storing the pseudo-random value and a hash value of the key service public key into non-volatile storage within the device during manufacture of the device, without storing the private key in the device.

3. The method of claim 2 including:
establishing a protected on-line server to support key retrieval requests from client computer systems to request a private key for a device of a class of devices present in a first client computer system, wherein the device does not include a private key and the first client computer system does not include an encrypted data structure associated with the device;
generating the encrypted data structure associated with the device, the encrypted data structure comprising a private key;
generating an identifier, based on the pseudo-random value, for the encrypted data structure; and
storing the identifier and the encrypted data structure in a first database of the protected on-line server in an entry indicated by the identifier.

4. The method of claim 3, further comprising:
generating multiple encrypted data structures for multiple devices in the class of devices, the multiple encrypted data structures comprising multiple different private keys based at least in part on a Direct Proof family key pair for the class of devices, wherein a family public key of the Direct Proof family key pair can be used to verify that a signature created by any private key corresponding to at least one device in the class of devices without determining which specific device created the signature;
generating multiple identifiers for the multiple encrypted data structures, based on pseudo-random values for the multiple devices;
storing the multiple identifiers and the multiple encrypted data structures in the first database of the protected on-line server;
storing a hash value of the key service public key into non-volatile storage in each of the multiple devices during manufacture of the devices; and
storing a different one of the pseudo-random values into non-volatile storage in each of the multiple devices during manufacture of the devices.

5. The method of claim 4, wherein:
the private keys comprise Direct Proof private signing keys based at least in part on a family private key of the Direct Proof family key pair; and
further comprising hashing the Direct Proof private signing keys to generate private key digests and including the private key digests in the encrypted data structures.

6. The method of claim 3, further comprising generating a symmetric key based on the pseudo-random value for the device.

7. The method of claim 6, wherein generating the identifier comprises encrypting a data value using the symmetric key.

8. The method of claim 6, further comprising encrypting the data structure using the symmetric key.

9. The method of claim 3, further comprising storing the key service public key on a manufacturing protected system.

10. The method of claim 3, wherein the pseudo-random value for the device is unique.

11. A non-transitory article storing instructions executed by a computer to perform the steps of:
storing, in a memory of a processor-based device, a family public key for use by said device, as well as a group of other devices, said family public key paired with a family private key not stored on said device; and
enabling a message signed with a direct proof private signing key, derived from said private signing key, to be verified by a member of said group using said family public key without revealing a member's identity.

12. The article of claim 11 comprising:
a storage medium having a plurality of machine readable instructions, wherein when the instructions are executed by a processor, the instructions provide for obtaining a private key for a trusted hardware device installed in a computer system by:
determining if an encrypted data structure associated with the trusted hardware device installed in a computer system is stored in a memory on the computer system, wherein the encrypted data structure comprises a private key, a private key digest, and a first initialization vector for the trusted hardware device, the trusted hardware device of a class of devices and wherein the trusted hardware device does not include the encrypted data structure and includes a unique pseudo-random value stored in a non-volatile storage of the trusted hardware device.

13. The article of claim 12 including:
if the encrypted data structure is not stored in the memory, obtaining the encrypted data structure associated with the trusted hardware device from a protected on-line server accessible by the computer system, the server storing a database of encrypted data structures, each associated with a device of the class of devices; and
processing the encrypted data structure and creating a localized encrypted data structure including the private key, the private key digest, and a second initialization vector, and storing the localized encrypted data structure in the memory.

14. The article of claim 13, wherein instructions for obtaining the encrypted data structure comprise instructions for issuing an acquire key command to the trusted hardware device to initiate a private key acquisition process.

15. The article of claim 13, wherein the private key comprises a Direct Proof private signing key based at least in part on a family private key of the Direct Proof family key pair for the class of devices.

16. The article of claim 15, wherein instructions for the private key acquisition process comprise instructions for obtaining, by the trusted hardware device, a key service public key signed by a corresponding key service private key from the protected online server.

17. The article of claim 16, wherein instructions for the private key acquisition process further comprise instructions for generating a symmetric key based on the unique pseudorandom value, and a device identifier, based on the pseudo-random value, for the encrypted data structure.

18. The article of claim 17, wherein instructions for the private key acquisition process further comprise instructions for generating a transient symmetric key by the trusted hardware device, building a retrieve key message including the device identifier and the transient symmetric key, encrypting the retrieve key message using the key service public key, and sending the encrypted retrieve key message to the protected on-line server.

* * * * *